(12) United States Patent
Clodfelter

(10) Patent No.: US 6,396,433 B1
(45) Date of Patent: May 28, 2002

(54) TALKING BURIED OBJECT DETECTOR

(75) Inventor: James F. Clodfelter, Vienna, VA (US)

(73) Assignee: Niitek Inc., Fairfax, VA (US)

( * ) Notice: Subject to any disclaimer, the term of this patent is extended or adjusted under 35 U.S.C. 154(b) by 0 days.

(21) Appl. No.: 09/828,937

(22) Filed: Apr. 10, 2001

Related U.S. Application Data

(60) Provisional application No. 60/195,308, filed on Apr. 10, 2000.

(51) Int. Cl.[7] .............................................. G01S 13/88
(52) U.S. Cl. ............................ 342/22; 342/27; 342/89; 342/90; 342/175; 342/195; 367/87; 367/93; 367/99; 367/107; 367/116; 704/270; 324/326; 324/332; 324/344
(58) Field of Search ............................ 342/21, 22, 27, 342/60, 175, 195, 104, 115, 118, 89, 90; 367/87, 88, 93, 95–116, 13; 324/326–329, 332–347; 704/270, 270.1, 271–278

(56) References Cited

U.S. PATENT DOCUMENTS

| 4,135,188 A | * | 1/1979 | Bickley, Jr. et al. | ........ 342/115 |
|---|---|---|---|---|
| 4,234,941 A | * | 11/1980 | Welland, Jr. et al. | ........ 367/116 |
| 4,489,405 A | * | 12/1984 | Tendler | ...................... 367/116 |
| 4,616,350 A | * | 10/1986 | Tendler | ...................... 367/116 |
| 4,621,348 A | * | 11/1986 | Tendler | ...................... 367/116 |
| 4,672,590 A | * | 6/1987 | Tendler | ...................... 367/116 |
| 4,870,687 A | * | 9/1989 | DeLeon | ...................... 704/270 |
| 4,972,379 A | * | 11/1990 | Harris, Jr. | .................... 367/13 |
| 5,930,200 A | * | 7/1999 | Kabel | ......................... 367/107 |

* cited by examiner

Primary Examiner—Bernarr E. Gregory
(74) Attorney, Agent, or Firm—James Creighton Wray; Meera P. Narasimhan

(57) ABSTRACT

A spoken word-producing detector identifies objects by comparing signatures of detected objects with stored signatures of known objects. When the signatures compare, the detector produces stored word sounds associated with the detected object identifications. An annunciator produces the words from pre-digitized human voice sounds. A screen displays the words.

17 Claims, 2 Drawing Sheets

TALKING BURIED OBJECT DETECTOR

This application claims priority from provisional application Ser. No. 60/195,308, filed Apr. 10, 2000.

BACKGROUND OF THE INVENTION

Existing methods of non-intrusive inspection, such as landmine detection, drug detection, stud-finding, corpse detection, and pipe finding, use detectors that beep and buzz when they detect an object. The existing detectors do not identify the object that has been detected.

SUMMARY OF THE INVENTION

The present invention overcomes the existing detector limitations by providing a detector that audibly identifies the object that has been sensed. The present invention improves performance, safety, and user training over existing detectors. Performance is enhanced by audible identification of the buried object. Safety is increased because the user's eyes and hands and mental capacity are not burdened by having to interpret and perform the automatic target recognition function. Training is much simplified since the operator only has to learn to manipulate the device, not to interpret its output.

The present invention improves buried object (landmines drugs, etc) detection capabilities worldwide. Improvements are realized in effectiveness, safety, speed, and accuracy over existing buried object detectors.

The present invention is a buried object detector that talks to the user. Preferably, the present invention is a talking landmine detector. However, the present invention is not limited to landmine detection systems. The present invention may also be used as a talking buried corpse detector, a talking stud-finder for finding hidden studs in walls, a talking contraband detector for finding concealed drugs, a talking buried pipe detector, or any other similar use. The system is trained by saving and categorizing high-fidelity returns that are relatively unique to the buried, hidden, or concealed object.

The process for detecting and identifying buried objects uses a computer, at least one sensor, and audio hardware that is controlled by the computer. The sensor uses a high frequency ground penetrating radar and a laptop computer.

The computer processes data from a sensor and determines the class or identity of a sensed object. For a landmine detector, example classes may be "mine" or "clutter", which are different types of mines. Some example identities may be 'IM1991, 'IM1411 and "Valmara 6911, which are mine types; or "rock" and "grass clump", which are clutter types. For a talking stud-finder, some example classes or identities may be 1 stud-left", "stud-right", "no stud", and "stud-centered." For a talking pipe-detector, some example classes or identities may be 115-inch plastic water pipe" and 112-inch fiber optic cable."

The computer contains at least two databases. One database links the class or identity of the sensed object with the signatures of the objects, where the signatures of the object are processed digitized sensor returns off of the object being sensed. The second database links the object's identity or class with the digitized sound file to be annunciated. Additional fields or the key defining the identity or class are included in the database, and are visually displayed by the computer.

The landmine detection ability is of interest to the U.S. Government and foreign governments and landmine removal firms. The buried corpse detection and drug detection abilities are of interest to law enforcement related agencies. Stud-finder and pipe-finder abilities are of interest to construction firms.

These and further and other objects and features of the invention are apparent in the disclosure, which includes the above and ongoing written specification, with the drawings.

DETAILED DESCRIPTION OF THE PREFERRED EMBODIMENTS

The present invention is a buried object detector that talks to the user. Preferably, the present invention is a talking landmine detector. However, the present invention is not limited to landmine detection systems. The present invention may also be used as a talking buried corpse detector, a talking stud-finder for finding hidden studs in walls, a talking contraband detector for finding concealed drugs, a talking buried pipe detector, or any other similar use. The system is trained by saving and categorizing high-fidelity returns that are relatively unique to the buried, hidden, or concealed object.

The process for detecting and identifying buried objects uses a computer, at least one sensor, and audio hardware that is controlled by the computer. The sensor uses a high frequency ground penetrating radar and a laptop computer.

The computer processes data from a sensor and determines the class or identity of a sensed object. For a landmine detector, example classes may be "mine" or "clutter", which are different types of mines. Some example identities may be 'IM1911, 'IM1411 and "Vahnara6911, which are mine types; or "rock" and "grass clump", which are clutter types. For a talking stud-finder, some example classes or identities may be "stud-left", "stud-right", "no stud", and "stud-centered." For a talking pipe-detector, some example classes or identities may be 115-inch plastic water pipe" and 112-inch fiber optic cable."

The computer contains at least two databases. One database links the class or identity of the sensed object with the signatures of the objects, where the signatures of the object are processed digitized sensor returns off of the object being sensed. The second database links the object's identity or class with the digitized sound file to be annunciated. Additional fields or the key defining the identity or class are included in the database, and are visually displayed by the computer.

The process of the present invention has four major components: 1) receiving sensor data; 2) processing the sensor data to determine the identity or class of the detected object; 3) correlating the identity or class with a digitized sound file; and 4) annunciating the digitized sound file.

Figure 1:
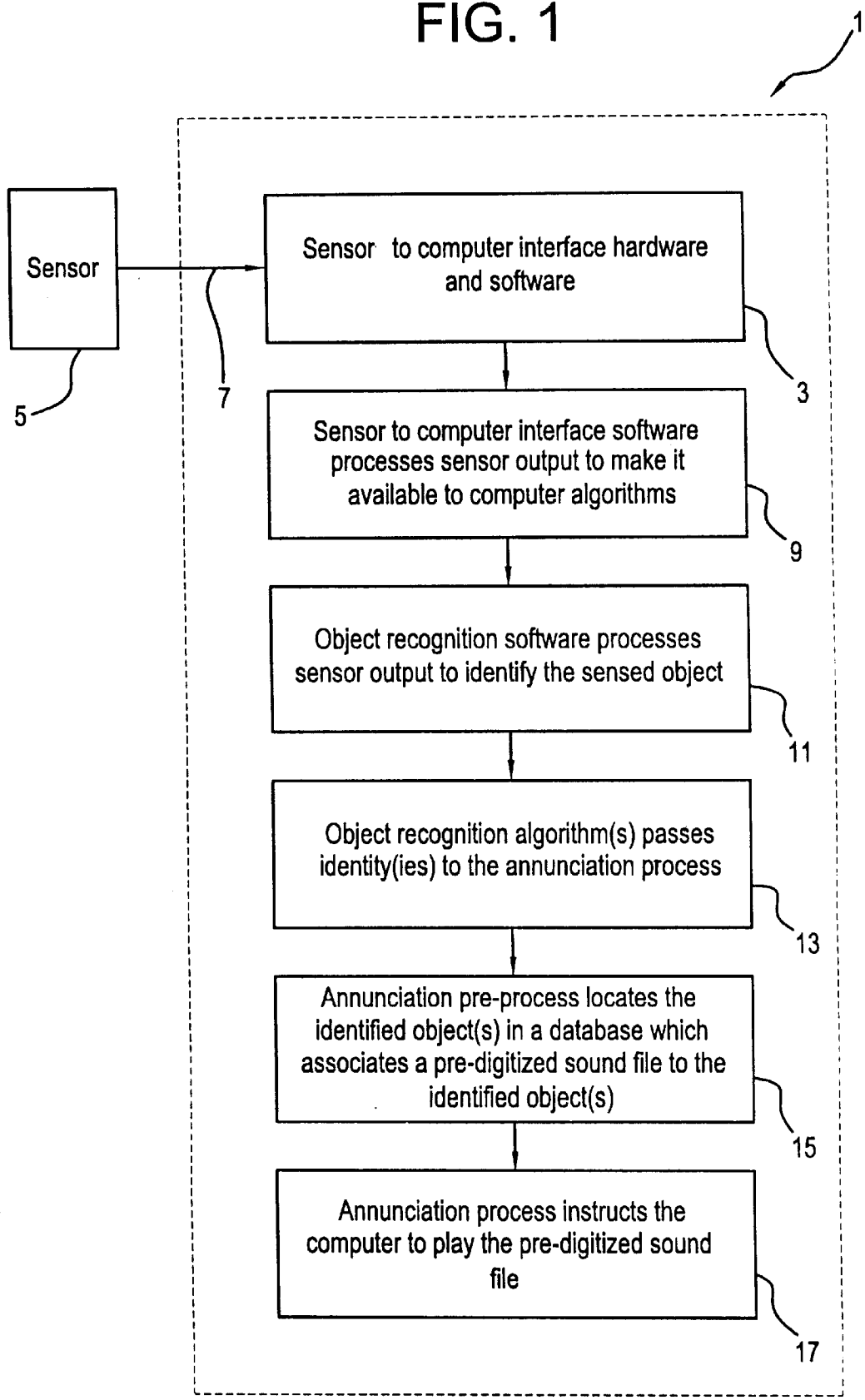
FIG. 1 is a flowchart of the process of identifying a buried object.
Figure 2:
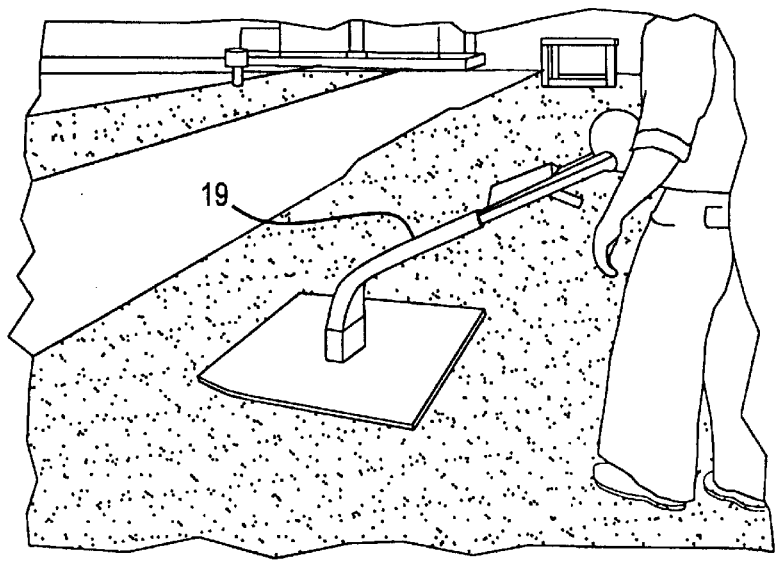
FIG. 2 is a perspective view of the present invention in use.
Figure 3:
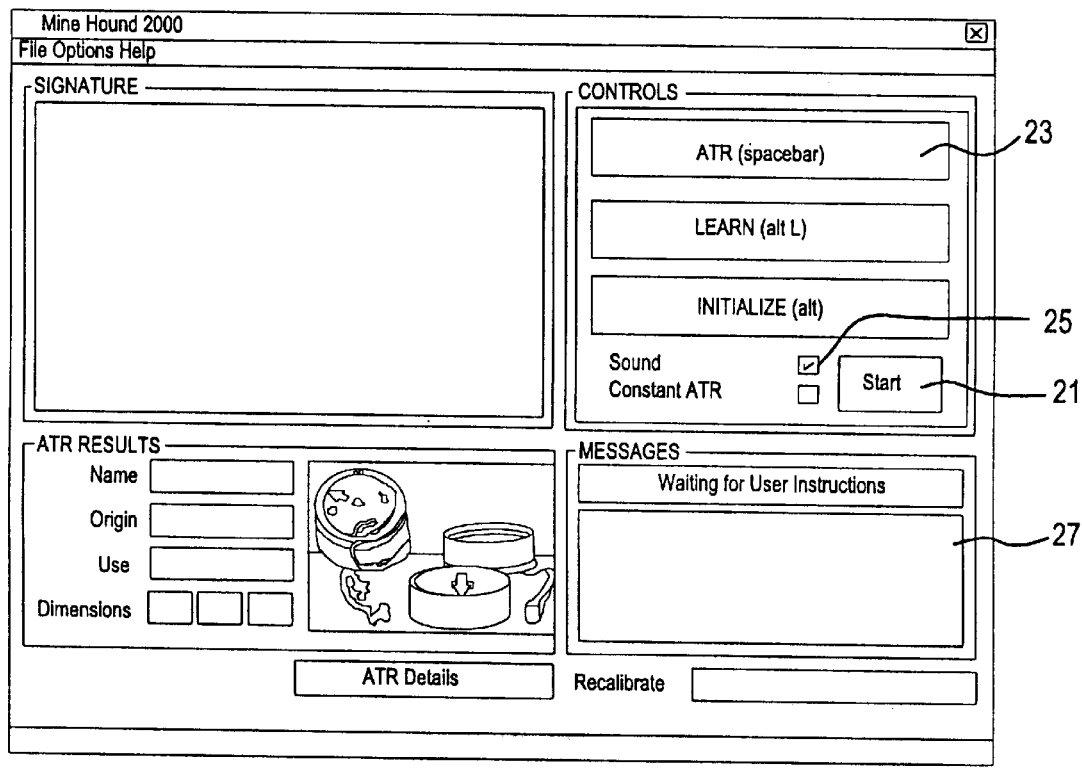
FIG. 3 shows a screen of a software program used with the present invention.

A flow diagram illustrating the process is shown in FIG. 1. A perspective view of the system in action is shown in FIG. 2. A computer screen capture of the software interface system of the present invention is shown in FIG. 3.

FIG. 1 is a flow diagram illustrating the process 1 of the present invention. The sensor to computer interface hardware and software step 3 reads the data 7 from the sensor 5 and makes it available to the computer. This component 3 is typically called data acquisition hardware and software. The hardware and software is available commercially from several vendors, and more than one type is suitable.

The next step is entitled "Sensor to computer interface software processes sensor output to make it available to computer algorithms" 9. This step 9 basically preprocesses the data to make it available to algorithms within the computer. The step 9 may serve one or more specific functions. One such function is to normalize and separate the serial data from the sensor into parallel channels of data.

The next step is entitled "Object recognition software processes sensor output to identify the sensed object" 11. This step 11 classifies or identifies the object that is being sensed. Many different algorithms and combinations of algorithms may be used. For example, a time-domain matched filter, frequency domain filters, or other signal and automatic target recognition (ATR) techniques may be used, or some combination thereof Preferably, a modified time-domain matched filter with some frequency domain-processing algorithm is used.

The next step is entitled "Object recognition algorithms passes identity(ies) to the annunciation process" 13. This step determines the validity of the classification or identification that was achieved by the ATR process 11. The identity or class of the sensed object is then passed to the annunciation process 15.

The next step is entitled "Annunciation pre-process locates the identified object(s) in a database which associates a pre-digitized soundfile(s) to the identified object(s)" 15. This step 15 determines which sound file(s) to play on the audio hardware. This is accomplished using a relational database or single flat file that has two or more fields. One field is the key that is provided by the ATR processes. The other field is the name(s) of the sound files to play (annunciate) when that object or class of object is detected. The present invention is not limited to identifying the object being sought. Other objects may be added to the databases, too. For example, for the landmine detector databases, rocks, shoes, calipers, bricks, and the absence of any object may be included in the databases. The process works not only for buried objects, but for objects on the surface as well.

The next step is entitled "Annunciation process instructs the computer to play the pre-digitized sound file" 17. This step 17 makes the hardware annunciate. A built-in sound function in the computer plays a sound file. The files may be in any computer readable format. The files may be stored in any computer accessible device from an EPROM to CI) ROM or on hard disk or in memory. The speaker(s) may be internal to the computer, or external, or a user of the detector may wear headphones. Preferably, WAV files are used by the computer.

Additional annunciation features of this device tell the operator how to use the detector. For example, the computer tells the operator when to re-calibrate the sensor, or when to replace the battery. Recalibration time is based on elapsed time and a measure of parameters in the returned signal. Battery replacement time is based on elapsed time in the current system but may be monitored by a battery-charge sensor.

FIG. 2 is a perspective view of the talking detector in use. The boom-like device slanting down into the middle of the figure is the radar antenna 19. The computer and associated hardware are not shown in the figure.

FIG. 3 shows the software interface to the present invention. The start button 21 begins data acquisition. The ATR button 23 tells the computer to identify or classify the detected object. When the sound check box 25 is checked, the software annunciates the identity or classification of the detected object. If the sound check box 25 is not checked, the name of the object is displayed in the box 27 under "MESSAGES". The constant ATR check box 29 tells the process to constantly examine the sensor output to determine the identity or class of the sensed object.

The invention provides a method of identifying objects with descriptive words by sensing objects with a sensor and producing sensor outputs, providing the sensor outputs from the sensor to the computer interface hardware and software in a computer, processing the sensor outputs and making the sensor outputs available as processed inputs to computer algorithms.

The processed inputs are provided to the object recognition algorithms, identifying the objects with the object recognition algorithms and producing object-identifying outputs.

An identified objects database associates pre-digitized sound filed with identified objects in the database.

The object-identifying outputs are provided to an identified object database.

A pre-digitized sound file associated with the identified object is provided to a sound player and plays sounds from the sound file and audibly identifies the sensed object.

The invention uses an object recognition database with objects and their signatures and compares the processed inputs with the signatures in the object recognition database. The objects are mines, clutter, buried corpses, studs, directions of studs, pipes or fiber optic cables.

The referred method includes producing high frequency surface penetrating radar signals, directing the radar signals through a surface, returning high frequency signals from objects beyond the surface, and employing the returned signals as the sensor outputs.

The providing of pre-digitized sound files preferably includes providing pre-digitized human voice sound files.

Using of the invention includes training the computer by sensing a known object, producing the sensor outputs from the known object, and providing the sensor outputs from the known object to a computer and processing the sensor outputs from the known object.

The processed sensor outputs from the known object are provided as training inputs to the computer software and adjust the identifying algorithms, and adjust or add to the identity database according to the training inputs related to the known object. The system training includes producing a known object output from the identifying algorithm, storing the known object output in the database, inputting known object sounds describing the known object in a digital recorder, digitizing the known object sounds, storing the digitized known object sounds in the annunciator database, and associating the stored digitized known object sounds with the stored known object output in the database. Preferably the inputting of known object sounds comprises speaking the known object sound into the digital recorder.

The invention includes a method of audibly identifying buried objects. A database is created. Returned signal characteristics of distinct buried or hidden objects are stores in the database.

Pre-digitized human voice sounds individually related to the objects are stored in the database.

The pre-digitized human voice sounds are associated with identified objects in the database.

A sensor is moved over an area where buried or hidden objects may be located.

High frequency radar signals are created and directed to the area.

Returned signal outputs from the area are sensed.

The returned signal outputs are provided to interface hardware and software of a computer.

The returned signal outputs are processed, and the processed returned signal outputs are made available to computer algorithms.

The processed return signal outputs are provided to object recognition software.

Identifying objects from the processed return signal outputs with object recognition algorithms occurs in the object recognition software.

Processed information from the recognition algorithms are provided to the database.

Identified objects and associated pre-digitized human voice sounds are located in the database.

The associated pre-digitized human voice sounds are supplied to an annunciator, and human voice sounds are annunciated according to the identified objects.

The invention provides a buried object detector with pre-digitized word descriptions.

A sensor has a sensor output.

A computer has interface hardware and software connected to the sensor output for processing the sensor output and making the processed sensor output available to computer algorithms.

Object recognition software is connected to the interface software for identifying a sensed object according to the processed sensor output and producing object identification outputs.

A sounds database has object identifications.

A pre-digitized sound file associates pre-digitized sounds with object identifications in the database.

Pre-processing software receives the pre-digitized sounds associated with the object identification in the database.

An annunciator connected to the computer plays the pre-digitized sounds associated with the identified object.

The sensor includes a ground penetrating radar and a return radar signal receiver.

The sensor is used with mines, clutter, buried corpses, studs, directions of studs, pipes or fiber optic cables.

While the invention has been described with reference to specific embodiments, modifications and variations of the invention may be constructed without departing from the scope of the invention, which is defined in the following claims.

I claim:

1. A method of identifying objects comprising: sensing objects with a sensor and producing sensor outputs; providing the sensor outputs from the sensor to the computer interface hardware and software in a computer;

processing the sensor outputs and making the sensor outputs available as processed inputs to computer algorithms;

providing the processed inputs to the object recognition algorithms;

identifying the objects with the object recognition algorithms and producing object-identifying outputs; providing an identified objects database; associating pre-digitized sound filed with identified objects in the database;

providing the object-identifying outputs to an identified object database; and providing a pre-digitized sound file associated with the identified object to a sound player and playing sounds from the sound file and audibly identifying the sensed object.

2. The method of claim 1, further comprising providing an object recognition database with objects and their signatures, and comparing the processed inputs with the signatures in the object recognition database.

3. The method of claim 1, wherein the objects are mines.

4. The method of claim 1, wherein the objects are clutter.

5. The method of claim 1, wherein the objects are buried corpses.

6. The method of claim 1, wherein the objects are studs.

7. The method of claim 1, wherein the objects are directions of studs.

8. The method of claim 1, wherein the objects are pipes.

9. The method of claim 1, wherein the objects are fiber optic cables.

10. The method of claim 1, wherein the sensing objects with a sensor comprises producing high frequency surface penetrating radar signals; directing the radar signals through a surface; returning high frequency signals from objects beyond the surface; and employing the returned signals as the sensor outputs.

11. The method of claim 1, wherein the providing pre-digitized sound files comprises providing pre-digitized human voice sound files.

12. The method of claim 1, further comprising:

training the computer by sensing a known object;

producing the sensor outputs from the known object;

providing the sensor outputs from the known object to a computer and processing the sensor outputs from the known object;

providing the processed sensor outputs from the known object as training inputs to the computer software and adjusting the identifying algorithms according to the training inputs related to the known object;

producing a known object output from the identifying algorithm;

storing the known object output in the database;

inputting known object sounds describing the known object in a digital recorder;

digitizing the known object sounds;

storing the known object sounds in the database; and associating the stored digitized known object sounds with the stored known object output in the database.

13. The method of claim 12, wherein the inputting of known object sounds comprises speaking the known object sound into the digital recorder.

14. A method of audibly identifying buried objects, comprising:

creating a database;

storing returned signal characteristics of distinct buried or hidden objects in the database;

storing pre-digitized human voice sounds individually related to the objects in the database;

associating the pre-digitized human voice sounds with identified objects in the database;

moving a sensor over an area where buried or hidden objects may be located;

creating high frequency radar signals;

directing the high frequency radar signals;

directing the high frequency radar signals to the area;

sensing returned signal outputs from the area;

providing the returned signal outputs to interface hardware and software of a computer;

processing the returned signal outputs;

making the processed returned signal outputs available to computer algorithms;

providing the processed return signal outputs to object recognition software;

identifying objects from the processed return signal outputs with object recognition algorithms in the object recognition software;

providing processed information from the recognition algorithms to the database;

locating identified objects and associated pre-digitized human voice sounds in the database; and supplying the associated pre-digitized human voice sounds to an annunciator and annunciating human voice sounds according to the identified objects.

15. A buried object detector comprising:

a sensor having a sensor output;

a computer having interface hardware and software connected to the sensor output for processing the sensor output and making the processed sensor output available to computer algorithms;

object recognition software connected to the interface software for identifying a sensed object according to the processed sensor output and producing object identification outputs;

a sounds database having object identifications;

a pre-digitized sound file for associating pre-digitized sounds with object identifications in the database;

annunciation pre-processing software for receiving the pre-digitized sounds associated with the object identification in the database; and an annunciator connected to the computer for playing the pre-digitized sounds associated with the identified object.

16. The apparatus of claim 15, wherein the sensor further comprises a ground penetrating radar and a return radar signal receiver.

17. The detector of claim 15, wherein the sensor is used with mines, clutter, buried corpses, studs, directions of studs, pipes or fiber optic cables.

* * * * *